Jan. 5, 1965   O. BARRETT   3,163,957
BAIT CASTING DEVICE
Filed June 10, 1963

INVENTOR.
ORVAL BARRETT
BY
Head & Johnson
ATTORNEYS

3,163,957
BAIT CASTING DEVICE
Orval Barrett, 3931 W. Easton, Tulsa, Okla.
Filed June 10, 1963, Ser. No. 286,709
2 Claims. (Cl. 43—41.2)

This invention relates to a bait casting device. More particularly, the invention relates to a fishing device utilized at the end of a fishing line providing means for distant and accurate casting of bait and in a manner permitting the use of live bait to be casted at greater distances.

Among all types of fishing baits, live minnows are probably used more than any other. In use the minnows are usually hooked through the lips or the dorsal area. In either case, minnows, being fragile creatures, are easily torn from the hook by the force of casting, especially if the angler attempts to cast the bait some distance. When a long cast is attempted, even if the minnow is not jerked from the hook at least the minnow is torn frequently to such an extent that its life as a live bait is shortened. This invention provides a means whereby a fisherman can utilize a live minnow in a manner to permit him to cast some distance from himself without loosing or injuring the minnow.

It is therefore an object of this invention to provide a bait casting device having the characteristics of providing a means whereby bait can be cast by fishermen to a greater distance.

Another object of this invention is to provide a bait casting device which functions in the dual capacity of a means of enclosing bait while it is being cast and, upon striking the water, and releasing the bait, functions as a float. Another object of this invention is to provide a hollow body of floatable material capable of receiving a fishing line and capable of enclosing and supporting bait while it is being cast and, upon striking the water, and releasing the bait, functions as a float.

Another object of this invention is to provide a hollow body of floatable material capable of receiving a fishing line and capable of enclosing and supporting bait while it is being cast and further identified by the characteristic of releasing the bait when the device strikes the water, the device after releasing the bait functioning as a float.

These and other objects and a better understanding of the invention may be had by referring to the following description and claims taken in conjunction with the attached drawings in which:

This invention may be described as a bait casting device. More particularly, but not by way of limitation, the invention may be described as a bait casting device comprising a hollow body of floatable material having a bait receiving opening at one end thereof, a door supported by a hinge to said body adaptable to close the open end of said body, means biasing said door to the open position, and a tripable latch means releasably securing said door in the closed position, said latch means actuatable on external contact to release said door from closed position.

Figure 1:
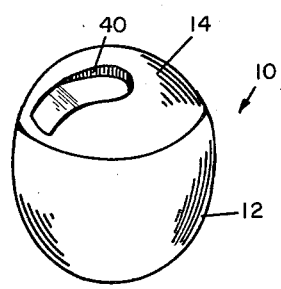
FIGURE 1 is an external plan view of one embodiment of the invention.

Referring now to the drawings and first to FIGURE 1, the bait casting device of this invention is generally indicated by the number 10. The device consists basically of a hollow body portion 12 made in almost any geometric configuration from some floatable material such as wood, plastic, cork, or any other similar material. Hinged to the body 12 is a door or lid 14.

Figure 2:
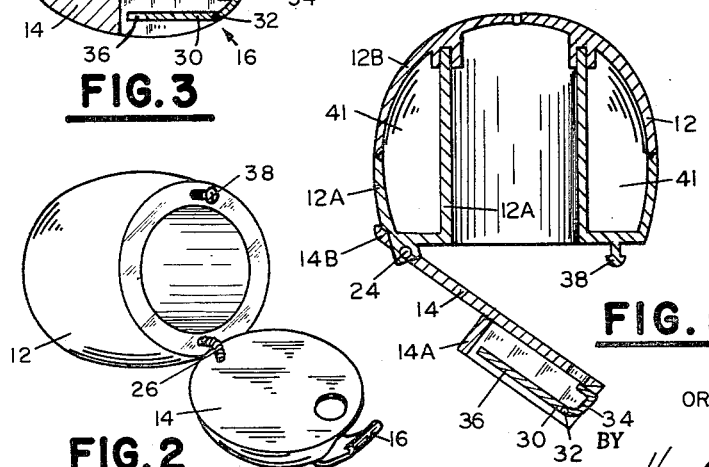
FIGURE 2 is an external plan view of the invention with the door opened.

Referring to FIGURE 2 the device is shown having the door 14 pivoted to the body 12 in the opened position. A latch means 16, which will be described in detail subsequently, is utilized to maintain door 14 in a closed position until the device strikes the water after being cast.

Figure 3:
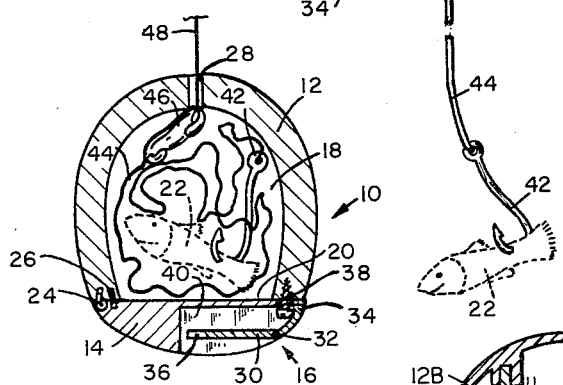
FIGURE 3 is a cross-sectional view of the device of this invention showing further details of construction and showing a minnow supported therein in a position for casting.

Referring next to FIGURE 3, a cross-sectional view, the device is best shown. The body 12, as has previously been indicated, may be of almost an unlimited variety of external configurations as long as a bait receiving chamber 18 is provided. Preferably the design of the invention is such that the external shape of the body is of a streamline configuration with the body substantially hollow. A bait receiving opening 20 is provided in what may be termed one end of the body 12. By the terminology "one end" of the body 12 is merely meant one external surface or area since if the device is designed to be substantially spherical there would be no particular "end" but the device would function in the same manner. The bait receiving opening 20 is preferably of a large diameter approximating the diameter of the bait receiving chamber 18 so that a fishing bait, in this case indicated by a minnow 22, can easily be inserted within the body. The door 14 may be of a variety of materials but most logically will be of a material equivalent to body 12. Door 14 is pivotally supported to body 12 by a hinge 24. In the closed position the door 14 closes, or substantially closes bait receiving opening 20. It is to be understood that such closure is not necessarily of a water tight fit but only such as to retain the bait such as minnow 22, within the bait receiving chamber 18.

Door 14 may be biased toward the open position such as by means of a spring 26 which is compressed when the door 14 is in the closed position but which expands, as shown in FIGURE 2, when the door swings in the open position.

A preferred embodiment includes the provision of a line receiving opening 28 preferably located opposite the bait receiving opening 20.

As it has been previously mentioned, a latch mechanism, generally indicated by the numeral 16 is utilized for the purpose of maintaining the door 14 in a closed position while the bait is being cast. A variety of different latch arrangements will be suggested. The embodiment shown includes the provision of a latch lever 30 supported by a pivot 32 to the door 14. The latch lever 30 includes a portion extending to one side of the pivot 32 constituting an integrally formed hook portion 34. Extending to the opposite side of pivot 32 is a flat pressure receiving portion 36.

Figure 4:
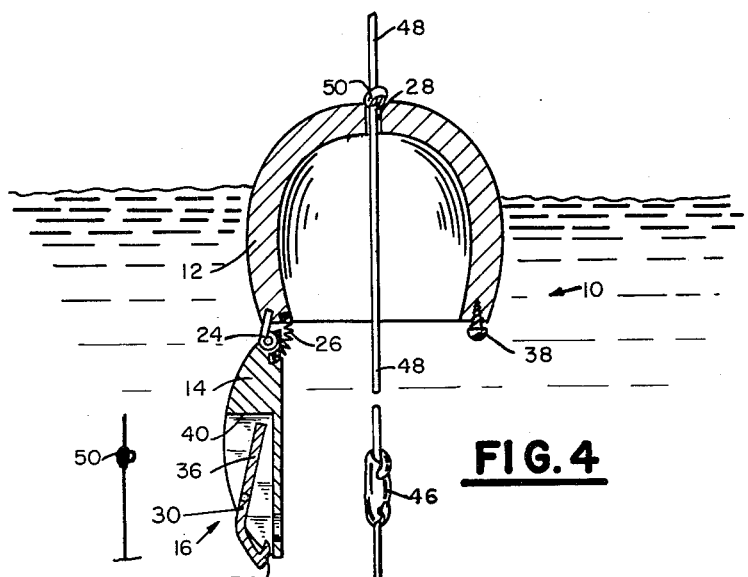
FIGURE 4 is a cross-sectional view of the device as it would appear after having struck the water and released the bait therein.

Extending from body 12 is a latch bolt 38, also shown in FIGURES 2 and 4, which may be in the form of a small screw. The head of the screw or latch bolt 38 receives the hook portion 34 of latch lever 30. In the position shown in FIGURE 3 the hook portion 34 extends under the head of the latch bolt 38 to retain door 14 in a closed position. Any pressure exerted against the pressure receiving portion 36 of the latch lever 30 pivots the hook portion 34 away from bolt 38 to release door 14 allowing spring 26 to push it open.

It can be seen that the latch, generally indicated by the numeral 16, is illustrated and described, is only by way of example and that a variety of latch configurations will be suggested. An obvious alternate arrangement would be to pivot the latch 16 to the body 12 with a hook arrangement engaging portion of door 14 to maintain a closed position.

An important provision of this invention is the provision of a recess 40 formed in door 14, or if the latch mechanism 16 is affixed to body 12 then such recess would be in the body 12. Recess 40 receives at least the pressure receiving portion 36 of the latch lever 30. This prevents the pressure receiving portion 36 from accidentally contacting any solid objects, such as the bottom or seat of a boat while the angler utilizing the device of this invention is preparing to cast it. Upon striking water however force of the water engages the pressure receiving portion 36 within the recess 40 and depresses it to pivot latch lever 30 thereby opening the door 14.

Figure 5:
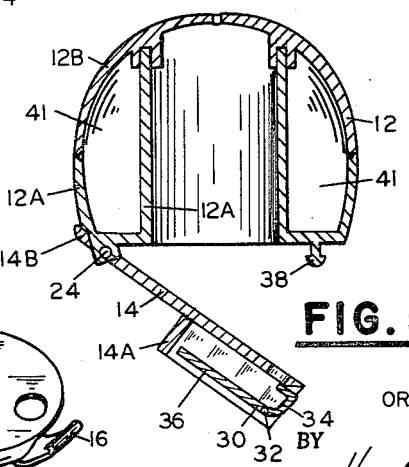
FIGURE 5 is a cross-sectional view of an alternate embodiment of the invention showing an arrangement particularly adaptable to be manufactured of molded plastic.

FIGURE 5 shows an alternate arrangement of the body 12 of the device. In this arrangement, most adaptable to be cast of plastic, hollow float chambers 41 are provided so that the device, upon striking the water, serves as a fishing float.

The geometrical arrangement of FIGURE 5 may be varied almost unlimitedly. In the embodiment illustrated the body 12 may be cast in two portions 12A and 12B and assembled as shown.

When a flat door 14 is utilized, as shown in FIGURE 5, the recess as above discussed, may be attained by providing raised portions 14A surrounding the pressure receiving portion 36 of the latch lever 30.

In some instances it may be desired that provisions be had to prevent the door 14 from opening too far so as not to upset the balance of the float action of the device in the water. To attain this objective an extension 14B may be provided on door 14 opposite hinge 24.

Operation

The operation of the device may best be described by referring to FIGURES 3 and 4. FIGURE 3 shows the device ready for casting. A minnow 22 which has been mounted on a hook 42 is supported within the bait receiving chamber 18. Hook 42 is fastened by means of a leader 44 to a weight 46 (typically a lead weight) which in turn is fastened to a fishing line 48. The line 48 extends through the line receiving opening 28. It can be seen that weight 46 is of a size incapable of passing through the opening 28 so that as the angler reels the line 48 towards him preparatory to casting, the weight 46 is drawn to engage the interior of opening 28. Formed in line 48 at a distance away from the weight 46 is a knot 50 which is preferably of a size small enough to pass through the eyes of the casting rod (not shown) but of a size large enough so it will not pass through the line receiving opening 28.

As previously stated, FIGURE 3 shows the device in the altitude for casting. The angler may draw the bait casting device 10 up to the end of his casting rod for most effective casting accuracy and distance. The device may be cast with as much force as the angler cares to use without any fear of jerking the hook 42 from the minnow 22 or injuring the minnow. This is true since the minnow 22 is freely supported within the bait receiving chamber 18 and is not acted upon by force applied by the hook 42.

Referring now specifically to FIGURE 4 the function of the device upon engaging the water after being cast is best shown. When the device 10 encounters the water at the end of an arched trajectory after being cast, the water exerts a force against the pressure receiving portion 36 of latch lever 30, pivoting it to release door 14. As the bait casting device 10 travels through the air in trajectory after being cast, line 48 will trail out behind it functioning more or less as tail or guiding means so that the portion of the device in forward movement under normal conditions will be the door 14 opposite the line receiving opening 28. This serves to insure that the device will strike the water in such a way that the force of the water will impinge against the pressure receiving portion 36 of the latch lever 30 to open door 14.

As soon as the device hits the water and door 14 opens weight 46 will fall downwardly through the water by the force of gravity, pulling the minnow 22, hook 42, and leader 44 with it until the knot 50 formed in the line engages the upper outer circumference of the line receiving opening 28. Thus, by varying the distance knot 50 is placed away from weight 46 the fishing depth can be adjusted.

The body 12 being of floatable material or having float chamber 41 provided as shown in FIGURE 5, functions, after it has released the bait, as a fishing float. The minnow 22 or other bait is gently pulled downwardly in the water by weight 46 so that the minnow is placed in good fishing position without having force exerted by hook 42.

An important advantage of this invention is the provision of means whereby increased casting distance may be obtained by an angler. Usually a minnow 22 with the associated hook 42, leader 44, and weight 46 represents a very light total weight and for this reason insufficient inertia is provided upon casting to pull line 48 with it. Thus the average angler is not able to cast a live bait, such as a minnow 22, very far. By this device minnow 22 is completely incapsulated during casting. The bait casting device may be constructed as large and as heavy as desired to achieve maximum casting distance. The angler can cast the bait with as much force as he desires to use without fear of tearing the minnow 22 from the hook 42.

After casting, when reeling in, the line 48 will pass upwardly through line receiving opening 28 until weight 46 engages the opening 48. In this manner the bait casting device is kept close to the weight and hook for ease of handling by the fisherman.

The embodiment set forth is by way of example. The device may be altered in a variety of ways within the purview of the invention. For instance, the body portion 12 may be composed of various types of plastic, including foam plastics. In one embodiment the hinge 24, when the device is constructed of plastic, may be a thin integrally formed plastic member. A means of biasing the door open, such as spring means 26 may be varied in a variety of ways. One obvious variation would include the use of a combination spring and hinge 24. The need for a door biasing means may be eliminated in some designs. Another obvious alteration of the invention would be the provision of a different latch mechanism 16. As has been previously indicated such a latch mechanism may be pivoted to the body rather than to door 14.

Throughout this description reference has been made to the utilization of the device for casting minnows. It is to be understood that the device is equally adaptable for casting other types of bait, such as blood bait and so forth, and that reference to its use to cast minnows is only by means of illustrating one facet of its use.

Although the invention has been described with a certain degree of particularity it is manifest that many other changes, in addition to those suggested above, may be made without departing from the spirit and scope of this disclosure.

What is claimed is:

1. A bait casting device for affixing to a fishing line, and projecting onto water comprising:
   a hollow body of floatable material having a bait receiving chamber therein and a fishing line receiving opening therein opposite and in communication with said bait receiving opening;
   a door;
   a hinge means pivotally supporting said door to said body whereby in the closed position said door substantially closes said bait receiving chamber of said body;
   a means biasing said door to an open position, there being an external recess in said door;

a latch lever pivotally supported to said door, said latch lever having a hook portion defining a hook to one side of the pivot and an impact receiving means to the opposite side of the pivot, said impact receiving means of substantially flat configuration and movably housed within said recess in said door; and a latch bolt extending from said body opposite said hinge means, said latch bolt releasably receiving said hook portion of said latch lever to retain said door in closed position, said door released to pivot to the open position when said impact receiving portion of said latch lever is engaged upon impact with said water.

2. A bait casting device for affixing to a fishing line, and projecting onto water comprising:

a hollow body of floatable material having a bait receiving chamber therein and a fishing line receiving opening therein opposite and in communication with said bait receiving opening;

a door;

a hinge means pivotally supporting said door to said body whereby in the closed position said door substantially closes said bait receiving chamber of said body, there being an external recess in said door;

a latch lever pivotally supported to said door, said latch lever having a hook portion defining a hook to one side of the pivot and an impact receiving means on the opposite side of said pivot, said impact receiving means of substantially flat configuration and movably housed within said recess in said door; and a latch bolt extending from said body opposite said hinge means, said latch bolt releasably receiving said hook portion of said latch lever to retain said door in closed position, said door released to pivot to the opened position when said impact receiving portion of said latch lever is engaged upon impact with said water.

References Cited in the file of this patent
UNITED STATES PATENTS

| | | |
|---|---|---|
| 2,435,011 | Mason | Jan. 27, 1948 |
| 2,475,736 | Burrous | July 12, 1949 |
| 3,059,370 | Moore | Oct. 23, 1962 |